3,640,935
METHOD FOR STABILIZING LATICES
Murray S. Abriss, 503 Maple Hill Road,
Havertown, Pa. 19083
No Drawing. Continuation-in-part of application Ser. No. 575,253, Aug. 26, 1966. This application Mar. 12, 1969, Ser. No. 806,685
Int. Cl. C08f 37/00
U.S. Cl. 260—29.6 TA
6 Claims

ABSTRACT OF THE DISCLOSURE

The method of improving the stability of a vinyl polymer latex by adding to the latex a non-ionic surface active agent in the form of a solution in a water-soluble glycol.

CROSS REFERENCE TO RELATED APPLICATION

This application is a continuation-in-part of application Ser. No. 575,253, filed Aug. 26, 1966 and now abandoned.

BACKGROUND OF THE INVENTION

This invention relates to a method for stabilizing vinyl addition polymer latices. It is more particularly directed to a method for adding certain non-ionic surface-active agents to such latices to improve their stability.

Addition of surface-active agents to polymer latices to improve freeze-thaw stability has been known for some time. But the particular way these agents were added to the latices was not thought to have any significant effect on their stability. I have found, surprisingly, that the stability of vinyl polymer latices against high mechanical shear, against repeated freezing and thawing and against coagulation by polyvalent metal ions is significantly improved if the surface-active agents are added to the latices as solutions in water-soluble glycols.

As an added benefit, my method permits preparation of usable vinyl addition polymer latices containing as much as 50–65% polymer solids, as contrasted to the 40–50% maximum obtained in the past. The advantage of this in terms of shipping costs is obvious. Moreover, by using my method, the same degree of stabilization can be obtained with as little as 2% by weight of a surface-active agent as was formerly gotten with from 5% to 6%. One can appreciate that the amount of money saved by this will be substantial.

SUMMARY OF THE INVENTION

The latices stabilized according to my invention are most useful for the manufacture of latex paints. These can be prepared by customary methods, using the usual adjuncts such as pigments, plasticizers, etc. The paints can be applied conventionally and require no unusual methods for drying.

The surface-active agents which can be used in my method are non-ionic and have Hydrophilic-Lipophilic Balance (HLB) Values [1] of from about 10 through about 15. Illustrative of these are:

| | | |
|---|---|---|
| Triton X-100 | Isooctyl phenyl polyethoxy ethanol, sold by Rohm & Haas Co. and having an HLB Value of about. | 13.5 |
| Igepal RC-630 | An alkyl phenoxy poly (ethyleneoxy)ethanol, sold by General Aniline & Film Corp. and having an HLB Value of about. | 12.3 |
| Igepal CO-630 | Nonylphenoxypoly(ethyleneoxy)ethanol, sold by General Aniline & Film Corp. and having an HLB Value of about. | 12.8 |
| Igepal CO-530 | Nonylphenoxypoly(ethyleneoxy)ethanol, sold by General Aniline & Film Corp. and having an HLB Value of about. | 10.4 |
| Igepal CA-630 | Octylphenoxypoly(ethyleneoxy)ethanol, sold by General Aniline & Film Corp. and having an HLB Value of about. | 13.5 |
| Tween 21 | Polyoxyethylene sorbitan monooleate, sold by Atlas Chemical Industries, and having an HLB Value of about. | 13.3 |
| Tween 60 | Polyoxyethylene sorbitan monooleate, sold by Atlas Chemical Industries and having an HLB Value of about. | 14.9 |
| Tween 80 | Polyoxyethylene sorbitan monooleate, sold by Atlas Chemical Industries and having an HLB Value of about. | 15.0 |

[1] HLB Value is a numerical representation of the hydrophilic and lipophilic tendencies of a surface-active agent. The Value can range from 0 for a completely lipophilic surfactant to about 20 for a completely hydrophilic surfactant. HLB Values are described in greater detail and methods for determining HLB Values are set out in "Clues to Surfactant Selection Offered by the HLB System" by W. C. Griffin, appearing in the June 1956 issue of "Official Digest," published by Federation of Paint and Varnish Production Clubs.
A table of HLB Values for common surface-active agents appears in an article by W. C. Griffin appearing in J. Soc. Coc. Chem., December 1954, pp. 249–256.

I prefer Triton X–100 and Igepal CO–630 because they give the best stability.

The substances in which the surface-active agents are dissolved before they are added to the vinyl polymer latices are "glycols," which in this context means not only true glycols such as ethylene glycol, propylene glycol and diethylene glycol, but also derivatives of these glycols such as Cellosolve, Carbitol, and Butyl Carbitol. These glycols must be water soluble, which means they must dissolve in water to the extent of at least 20% by weight. I prefer ethylene glycol, propylene glycol and diethylene glycol because they give the best results.

My method will stabilize the latex of any vinyl addition polymer, i.e., any polymer or copolymer of $\alpha,\beta$-ethylenically unsaturated monomers. For example, it can be used to stabilize latices of the homo- or co-polymers of esters of acrylic acid or methacrylic acid with alkanols of from 1 to 8 carbon atoms, styrene, $\alpha$-methylstyrene, vinyl toluene, vinyl acetate, fumaric acid, itaconic acid, maleic acid, butadiene, acrylonitrile, acrylic acid, and methacrylic acid.

My method works best with latices of acrylic polymers and copolymers of methacrylic acid esters with butadiene.

To practice my invention, one first selects the polymer latex he wishes to use. The concentration of polymer in this latex is a matter of selection according to need, although the best stability is obtained when the latex contains from about 20% to about 50% of polymer solids.

The surface-active agent is then selected, also to fit need, according to well-known principles of paint chemistry. The amount of surface-active agent to be used will naturally depend on the type of latex, the type of surface-active agent, the concentration of polymer solids in the latex and the size of the polymer particles. In most cases, concentrations of from 0.5% to 3%, by weight of the latex, will be satisfactory.

The glycol is in most cases selected to fit the latex and its ultimate use. In certain instances it may be desirable to have a glycol present in the latex, and in others not. In either case, the selection of a surface-active agent and the amount to use will be an easy matter for a skilled paint formulator.

After the selection of latex, surface-active agent and glycol has been made, one simply makes a 30 through 70% by weight solution, preferably 50%, of the surface-active agent in the glycol. The exact concentration will depend in large measure on the solubility of the surface-active agent in the solvent and the amount of glycol which the latex's use can tolerate. This solution is then added directly to the latex, with stirring. I prefer that this solution be added to the latex immediately after the latex's preparation because of the sensitivity of most vinyl polymer latices to shear. The latex is then ready for use.

DESCRIPTION OF THE PREFERRED EMBODIMENTS

The following examples illustrate the invention. All parts are by weight.

EXAMPLE 1

A latex of a methyl methacrylate/2-ethylhexyl acrylate/methacrylic acid terpolymer, whose monomer unit weight ratios are 44/54/2 respectively, is prepared by conventional emulsion polymerization. This latex contains about 46% polymer solids.

To 15,550 parts of this latex is added a solution of 268 parts of Triton X–100 in 346 parts of ethylene glycol. The mixture is stirred for 10 minutes.

The resulting product can be made into a latex paint according to standard formulae.

A comparison of this latex with a similar latex, stabilized with the same surface-active agent but in the conventional manner, is shown in the following table:

| | Surfactant added | |
|---|---|---|
| Treatment | Conventionally | According to invention |
| Waring Blendor, 10 minutes (high shear). | Excessively thick, latex unusable. | No change. |
| 3 alternate freeze/thaw cycles (one cycle being 16 hours at −20° F. followed by 8 hours at ambient temp.). | Coagulated after the second cycle. | Unaffected. |
| Tolerance to polyvalent metal ions (10% calcium chloride solution; 50 drops added to 25 g. of latex). | Excessively thick | Very slight thickening. |

EXAMPLE 2

A latex of a butadiene-1,3/methyl methacrylate/methacrylic acid terpolymer whose monomer unit weight ratios are 32/66/2 respectively, is prepared by conventional emulsion polymerization, under pressure. This latex contains about 48% polymer solids.

To 870 parts of this latex is added a solution of 12.5 parts of Igepal CO–630 in 12.5 parts of carbitol. The mixture is stirred for ten minutes to give a latex having substantially the same stability characteristics as the latex of Example 1.

Other vinyl addition polymers, surfactants and glycols can be used in the manner shown in the foregoing examples, with equivalent results.

EXAMPLE 3

To 1000 parts of the latex of Example 1 is added, with stirring, a solution of 11.5 parts of Triton X–100 in 11.5 parts of ethylene glycol.

To another 1000 parts of the same latex, 11.5 parts of Triton X–100 and 11.5 parts of ethylene glycol are added separately, with stirring.

A comparison of the two latices is shown in the following table:

| Treatment | Surfactant added according to invention | Surfactant and glycol added separately |
|---|---|---|
| Waring Blendor, 10 minutes (high shear). | No change | Excessively thick. |
| 5 alternate freeze/thaw cycles (one cycle being 16 hours at −10° F. followed by 8 hours at room temperature). | Unaffected | Coagulated after second cycle. |
| Tolerance to polyvalent metal ions (10% calcium chloride solution; 50 drops added to 25 g. of latex). | Very slight thickening. | Coagulated. |

I claim:

1. A method for improving the stability of a methyl methacrylate/2-ethylhexyl acrylate/methacrylic acid terpolymer latex or a butadiene/2-ethylhexyl acrylate/methacrylic acid terpolymer latex, said method comprising first dissolving from about 0.5% to about 3% (by weight of said latex) of a non-ionic surface-active agent having an HLB value of from about 10 to about 15 in a water-soluble glycol or water-soluble glycol derivative, and then adding the resulting solution to said latex.

2. The method of claim 1 wherein the glycol is ethylene glycol.

3. The method of claim 1 wherein the surface active agent is isooctyl phenyl polyethoxy ethanol.

4. The method of claim 1 wherein the surface active agent is nonyl phenoxy poly(ethyleneoxy)ethanol.

5. A methyl methacrylate/2-ethylhexyl acrylate/methacrylic acid terpolymer latex stabilized by the method of claim 1.

6. A butadiene/2-ethylhexyl acrylate/methacrylic acid terpolymer latex stabilized by the method of claim 1.

References Cited

UNITED STATES PATENTS

| | | | |
|---|---|---|---|
| 2,795,564 | 6/1957 | Conn et al. | 260—29.6 |
| 3,037,881 | 6/1962 | McDowell | 117—72 |
| 3,057,812 | 10/1962 | Straughan et al. | 260—29.6 |
| 3,309,331 | 3/1967 | McDowell et al. | 260—29.6 |

MELVIN GOLDSTEIN, Primary Examiner

U.S. Cl. X.R.
260—29.6 T, 29.6 E, 29.6 ME

PO-1050
(5/69)

UNITED STATES PATENT OFFICE
CERTIFICATE OF CORRECTION

Patent No. 3,640,935   Dated February 8, 1972

Inventor(s) Murray S. Abriss

It is certified that error appears in the above-identified patent and that said Letters Patent are hereby corrected as shown below:

In column 1, after the inventor's address, add

", assignor to E. I. du Pont de Nemours and Company."

Signed and sealed this 8th day of August 1972.

(SEAL)
Attest:

EDWARD M. FLETCHER, JR.　　　ROBERT GOTTSCHALK
Attesting Officer　　　　　　　Commissioner of Patents